(12) United States Patent
Pfeiffer et al.

(10) Patent No.: US 11,409,731 B2
(45) Date of Patent: Aug. 9, 2022

(54) SELF-ADAPTIVE DATA SOURCE AGGREGATION SYSTEM AND METHOD

(71) Applicant: AMADEUS S.A.S., Biot (FR)

(72) Inventors: Thilo Alexander Pfeiffer, Sydney (AU); Ahmed Ben Abderrahmane, Nice (FR); Baptiste Chatrain, Madrid (ES); Pranav Pandey, Nice (FR); Michael Mangili-Vincent, Sydney (AU)

(73) Assignee: AMADEUS S.A.S., Biot (FR)

( * ) Notice: Subject to any disclaimer, the term of this patent is extended or adjusted under 35 U.S.C. 154(b) by 143 days.

(21) Appl. No.: 16/715,496

(22) Filed: Dec. 16, 2019

(65) Prior Publication Data

US 2020/0201840 A1 Jun. 25, 2020

(30) Foreign Application Priority Data

Dec. 21, 2018 (FR) ...................................... 1874007

(51) Int. Cl.
*G06F 16/23* (2019.01)
(52) U.S. Cl.
CPC ...... *G06F 16/2365* (2019.01); *G06F 16/2379* (2019.01)
(58) Field of Classification Search
None
See application file for complete search history.

(56) References Cited

U.S. PATENT DOCUMENTS

| | | | |
|---|---|---|---|
| 2013/0144605 A1* | 6/2013 | Brager | G06F 40/40 704/9 |
| 2014/0101091 A1 | 4/2014 | Brown et al. | |
| 2015/0199744 A1* | 7/2015 | Tolvanen | G06F 16/9537 707/737 |
| 2019/0370233 A1* | 12/2019 | Yamashita | G06F 16/903 |

OTHER PUBLICATIONS

Xintong, Guo, et al., "Brief Survey of Crowdsourcing for Data Mining", Elsevier, Expert Systems with Applications, vol. 41 (2014, pp. 7987-7994. (Year: 2014).*

\* cited by examiner

*Primary Examiner* — Scott A. Waldron
(74) *Attorney, Agent, or Firm* — Perry + Currier

(57) ABSTRACT

A data aggregation system for aggregation of data from at least two data sources includes: a data aggregation unit configured to determine a data aggregation action to be executed by the system, in response to a message received by at least one data source device, each message comprising data; a consistency checking unit configured to check the consistency of each message received from a data source device using one or more consistency rules and determine an action to be executed by said data aggregation unit depending on the consistency checking; and an accuracy metric determination unit configured to determine an accuracy metric for the executed action based on feedback values received from a set of at least one user device, said data aggregation unit comprising a rule updating unit configured to update said consistency rules based on the accuracy metrics determined for the executed actions.

13 Claims, 4 Drawing Sheets

SELF-ADAPTIVE DATA SOURCE AGGREGATION SYSTEM AND METHOD

CROSS-REFERENCE TO RELATED APPLICATION

This application claims priority from French patent application no. 1874007, filed Dec. 21, 2018, the contents of which is incorporated herein by reference.

TECHNICAL FIELD

The invention generally relates to computers and computer software and, in particular, to systems, methods, and computer program products for dynamically aggregating data from multiple data sources.

BACKGROUND

Computerized systems and networks are widely used to improve productivity and optimize resources in environments where important data flows are to be exchanged between multiple user devices. In some computerized systems or architectures, data can be collected within a centralized system (target system) from multiple data sources connected to the target system through a network.

Such multiple data sources publish or push or transmit various data in their own data format to the target system.

Currently, a target system receiving data from multiple data sources, having multiple data formats, merges such data statically and can select an action to be executed based on such merged data. Such data merging may create complex problem of inconsistencies. Further, in some environments, such data merging is submitted to time constraints as a decision is to be made in quasi real-time as regards the actions that are to be executed based on the data received from the multiple sources. In particular, in some existing systems, the determination of the action to be performed is required to be made by a human operator managing the target system. Moreover, when the target system connects to a new data source, a new parser is to be added statically to the target system, during a maintenance phase, which blocks the production of the target system. Further, if a parser related to a given data source has to be modified, for example to add a new rule, it is required to statically add the code related to the new rule before runtime. Therefore, any change related to the data sources connected to the target system requires statically implementing additional decoupled rules into the target system and adding additional hard code to implement new action decision support rules taking into account the change.

Existing approaches for merging data from multiple data sources into a target system accordingly slows down the target systems real time processing and impacts the target system's latency due to the time needed to integrate a new data source or update the parser related to a given data source connected to the system. In particular, integrating a new data source or updating the parser related to a given data source can block the target system during runtime (production phase). Further, high software maintenance costs are required as the behaviour of the data source devices can evolve and change rapidly.

For example, the operation of an online content provider system or more generally the operation of a cloud computing based system sharing pools of configurable computer system resources over the Internet to deliver content or products to a user can be delayed by the integration of a new data source (e.g. new computer system resource), thereby creating a delay in the transmission of the content or product to the user.

There is accordingly a need to improve the speed, the real-time processing of the received data volumes and the computational complexity of existing systems merging data from multiple data source devices.

SUMMARY

In order to address these and other problems, there is provided a data aggregation system for aggregation of data from at least two data sources device, each data source device being connected to the data aggregation system through a network. The system comprises a data aggregation unit configured to determine a data aggregation action to be executed by the system, in response to a message received by at least one data source device, each message comprising data, the system further comprising a consistency checking unit configured to check the consistency of each message received from a data source device using one or more consistency rules and determine an action to be executed by the data aggregation unit depending on the consistency checking. The system further comprising an accuracy metric determination unit configured to determine an accuracy metric for the executed action based on feedback values received from a set of at least one user device, the data aggregation unit comprising a rule updating unit (106) configured to update said consistency rules based on the accuracy metrics determined for the executed actions.

In one embodiment, the data are managed within each data source device in at least one source data format and the data are managed within the data aggregation system in at least one target data format, the aggregation system comprising a parsing unit configured to parse each data message received from a given data source device in a source data format and a translation unit configured to translate at least a part of the data comprised in the parsed message into a target data format.

The data aggregation system may comprise storage means for storing at least a part of the translated data.

In one embodiment, each message received from a data source device comprises an identifier identifying the data source device.

In some embodiments, the data aggregation system may be configured to execute a value function using one or more parameters derived from the feedback values received from the set of user devices for the executed action as inputs and providing an output value, the accuracy metric unit determining an accuracy metric for the executed action based on the output value.

The one or more parameters may comprise the number of occurrences of a given feedback value received from the set of user devices.

In one embodiment, the given feedback value is a value indicating a rejection of the action.

In some embodiments, the value function may provide an output representing a reward value for the action.

Advantageously, the consistency rules may comprise a set of decision making functions configured to determine a data aggregation operation to be executed from the received messages.

In particular, the decision making functions may be based on data cleaning, and or data merging and/or data consolidation conditions and/or received feedback values for previous actions.

There is further provided a method of aggregating data from at least two data sources device in a data aggregation system, each data source device being connected to the data aggregation system through a network. Advantageously, the method comprises: determining a data aggregation action to be executed by the data aggregation system, in response to a message received from at least one data source device, each message comprising data, checking the consistency of each message received from a data source device using one or more consistency rules, and determining an action to be executed depending on the consistency checking.

The method comprises determining an accuracy metric for the executed action based on feedback values received from a set of at least one user device. The method further comprises a step of updating said consistency rules based on the accuracy metrics determined for the executed actions.

Embodiments of the invention advantageously provide a self-adaptive data aggregation method and system which obviates the need for hard coding or decoupled rules to integrate change related to the data source or improve the determination of the actions to be executed.

BRIEF DESCRIPTIONS OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
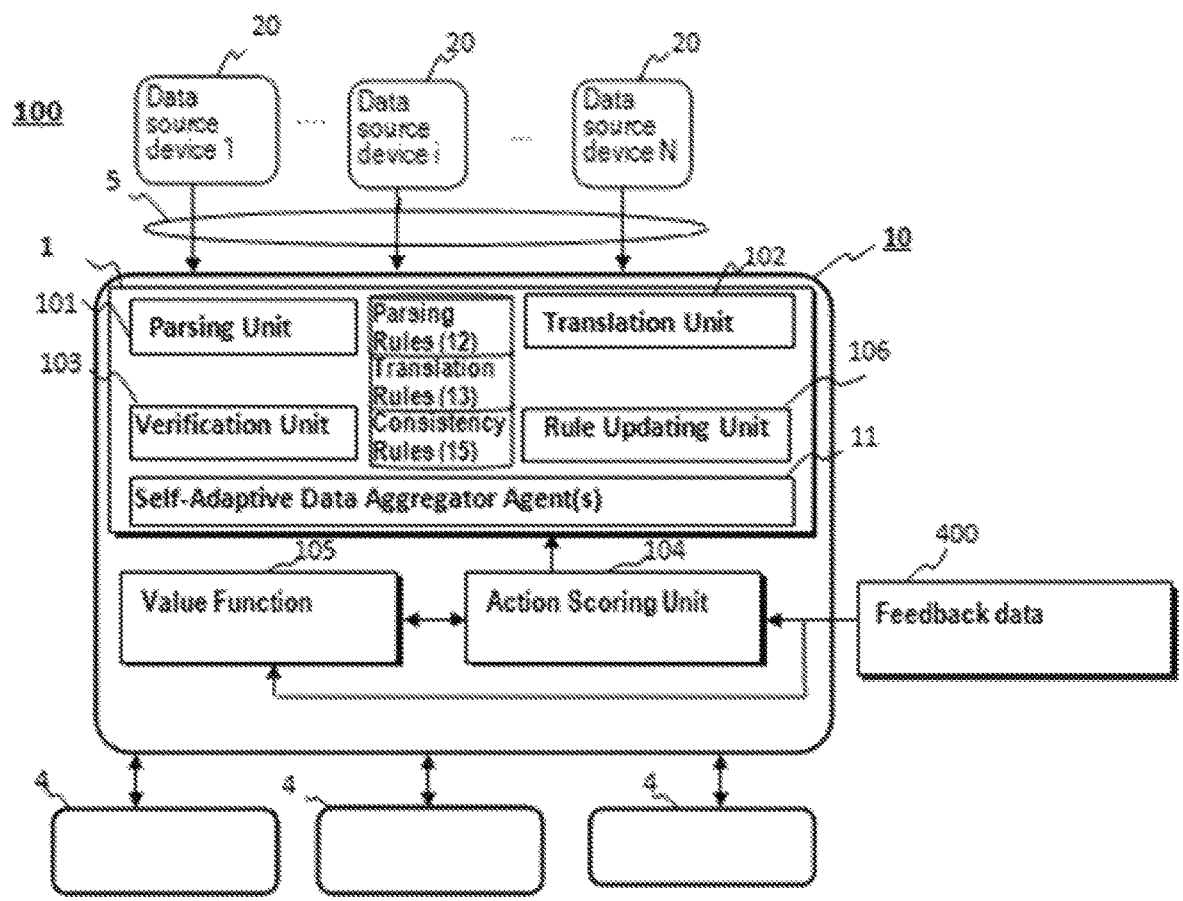
FIG. 1 is a diagrammatic view of a data aggregation system in communication via a network with multiple data sources, according to some embodiments.

Referring to FIG. 1, an exemplary operational environment 100 of a data aggregation system 10 is shown, in accordance with some embodiments of the invention.

The data aggregation system 10 (also referred to as "target system") may be connected to one or more computer data source devices 20 (also referred to hereinafter as "data sources" or "feeding devices"). Each data source device 20 is configured to manage data having one or more source format(s). As used herein, the terms "manage data" refer to any processing that can be performed by a data source device including storage, transmission, or any operation/function/application executed on the data. The data managed by the different data source devices 20 may be all related to a same application field or to various application fields, the data aggregation system executing applications based on the data aggregated from the different data source devices 20.

The data source devices 20 may be trusted devices enabled to communicate with the target system 10 using a cryptographic process such as an encryption/decryption process or an authentication process.

The data source devices 20 may manage interdependent data in the sense that any change made to data managed by one data source device 20 may impact the data managed by one or more other data source devices or be independent from other data source devices. The data source devices may be for example content provider systems, providing various content or particular data source devices or tools. Alternatively, the data source devices 20 may manage independent data.

Each data source device 20 may be accessed by one or more users, each user being equipped with a user device 4. The access or the management of a data source device 20 may be limited to a limited set of users using an authentication process.

In some embodiments, a data source device 20 may be further connected to other external systems, tools, or databases for data exchange.

Each user device 4 may be a personal computing device, a tablet computer, a thin client terminal, a smartphone, and/or any other computing device that enables the user to submit requests to the self-adaptive aggregation unit 1 over the network 5. Each user device 4 may host web browsers and/or custom applications software (e.g., a client system) and may include a client user interface (such as a Graphical User Interface GUI).

A data source device 20 may comprise one or more storage devices to store data in one or more source formats. The data handled by each data source device 20 may in particular correspond to a data scheme defined by the one or more data source formats.

The data aggregation system 10 may be configured to dynamically aggregate the data from the multiple data source devices 20 and can centrally manage such data in a way that a change related to a data source device 20 can be dynamically integrated into the target system 10 during runtime without the need to hard code the changes and interrupt the operation of the target system. Exemplary changes related to a data source device 20 include for example a change in the data managed by one data source device 20, a change in the format(s) of the data managed by one data source device 20, connection of a new data source device 20 to the target system 10, disconnection of an existing data source device from the target system 10.

Each data source device 20 may communicate with the aggregation device 10 through at least one network 5. A network 5 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. The network 5 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over the network 5 according to different data exchange technologies and/or formats such as the hypertext markup language (HTML) and the extensible markup language (XML).

In some embodiments, the data source devices 20 may further interact with each other through the data aggregation system 10, using a network.

The data aggregation system 10 may be configured to aggregate data from the multiple data source devices 20, each data source device 20 managing the data in one or more source data formats defined by a data source scheme. In particular, the data aggregation system 10 may be configured to discard, store or update at least a part of a message (i.e. partially or fully) received from a data source device 20, the message comprising data in a data source format.

The data aggregation system 10 may comprise a self-adaptive aggregation unit 1 configured to process data messages received from one or more data source devices and determine a data aggregation action to be executed depending on the processing of the data messages.

The self-adaptive aggregation unit 1 may comprise one or more self-adaptive aggregator agents 11 configured to perform (or execute) a data aggregation action. The self-adaptive aggregator agents 11 may be further configured to dynamically update (or refine) a set of consistency rules 15 maintained by self-adaptive aggregation unit 1 based on meta-learning data.

In one embodiment, the data aggregation system 10 may comprise storage means, such as one or more memories or one or more databases to store the data received from the data source devices 20.

The data received from each data source device 20 (also referred to as an "emitting" data source) may be received in a given source format which corresponds to the format of the data according to which the emitting data source device 20 manages (e.g. stores, processes or transmit) the data.

The data aggregation system 10 may comprise a data parsing unit 101 configured to parse a data message received from a data source device 20 in a given data source format prior to transmission to the translation unit 101.

The data parsing unit 101 may apply one or more parsing rules 12.

The data aggregation system 10 may further comprise a translation unit 102 configured to translate the format of the data comprised in the data message received from a data source device 20 into a predefined target format, using one or more translation rules (or policies) 13.

The data aggregation system 10 may store the translated data received from the data source device 20 in the storage and/or use them to determine a data aggregation action to be executed. The storage means may maintain the data aggregated from the different data source devices 20 in the target format.

The data aggregation system 10 may comprise a verification unit 103 (also referred to as a "data consistency checker") configured to check the consistency of a received data message using the consistency rules based on the translated data. The verification unit 103 may be configured to check the consistency of a received data message by applying consistency rules 15 and by taking into account data previously received by other data source device (which can be stored in the target system, for example in a storage means).

Initial consistency rules 15 may be loaded at load time. The data aggregation system 10 then continuously refines the consistency rules during runtime using meta-learning data.

If the verification unit 103 determines that the translated data meet one or more predefined consistency rules, the data may be stored in the storage means or directly processed by the target system (for example, they may be used by one or more applications executed by the target system 10).

In some embodiments, the data aggregation system 10 may further determine a data aggregation action to be executed as a result of the consistency checking phase. The data aggregation agents may then execute or trigger execution of the data aggregation actions.

In some embodiments, the data aggregation system 10 may further comprise an action scoring unit 104 (also referred to hereinafter as an "accuracy metric determination unit" configured to determine an accuracy scoring (also referred to hereinafter as "an accuracy metric") for each executed action based on feedback data 400 received from a set of at least one users.

The data aggregation system 10 may for example submit a notification related to an executed action to the set of users, each user being equipped with a user device 4, in response to the execution of the action by the data aggregation system 10. Such notification may comprise a message prompting each user to provide feedback data related to the executed action. The notification may further comprise an identifier identifying the action for which each user is prompted to input feedback data.

In response to the notification, each user may transmit a message comprising feedback value(s) 400 (also called "user feedback data") to the data aggregation system 10 using the user device 4. Such feedback data 400 represent real time data observed or measured by the user. The message comprising the feedback data 400 may further comprise the identifier identifying the action related to the notification and possibly an identifier identifying the user device 4 from which the feedback data have been received.

In one embodiment, the user may select a feedback value among a list of feedback values displayed on a dedicated interface on a Graphical User Interface provided on the user device 4. The feedback values may for example comprise an accept value (indicated that the executed action is accepted), a reject value (indicating that the action is rejected), or a "no response" value is none of the accept/reject values are preferred by the user.

In response to the receipt of user feedback data 400 from the different users of the set of users, the action scoring unit 104 may be configured to compute an accuracy scoring (also called "accuracy weight" or "accuracy metric") associated with the executed action using a predefined value function 105. In one embodiment, the value function 105 may take as inputs one or more parameters related to the feedback data 400 received from the set of user devices. The parameters related to the feedback data 400 may comprise for example a parameter representing the number of occurrences of a given feedback value received from the set of user devices, such as for example the number of time the feedback has been negative (or rejected) for the considered action (meaning that the rule is inconsistent) over the users of the set of users. In one embodiment, the value function may for example provide an output representing a reward value (also called "output value") for the considered action, the reward value be used by the action scoring unit 104 to determine an accuracy scoring associated with the action. As used herein, a "negative" feedback refers to a feedback value provided by a user to indicate that a rule is inconsistent. A negative feedback can be thus provided by a user to indicate a rejection of the considered action by a user (reject option).

In some embodiments, the Adaptive Data Aggregator Agent(s) 11 may comprise a rule updating unit 106. The rule updating unit 106 may be configured to update (or refine) one or more consistencies rules 15 based on the accuracy scoring determined for a given action by the accuracy scoring unit 104.

The consistencies rules (or "policies") 15 applied by the verification unit 103 may comprise a set of decision making functions based on data cleaning, merging and/or consolidation conditions, such decision making functions being configured to determine a data aggregation function (or operation) to be executed from the received messages.

As used herein, an "action" refers to one or more data aggregation operation or applications executable by the aggregator agents 11 in response to the consistency checking.

As used herein a "feedback" (also referred to as "feedback data" or "feedback value") refers to data representing a user assessment of the relevance of an executed action.

As used herein, a "Value function" refers to a function configured to determine a parameter such as a "reward" from the feedback data 400 received by a set of users in relation to the action. It should be noted that, although represented outside the action scoring unit 104, in some embodiments, the value function 105 may be part of the action scoring unit 104 (implemented directly by the action scoring unit 104).

The embodiments of the invention thus enable reconciliation of real-time data from multiple data source devices 20 using a self-adaptive process.

The invention may be applied for example to a delivery system of an online retailer. Such retailer may have multiple systems feeding data on the position of the package, for example in transit or in route for delivery or being delivered. Each package may be scanned at each transit point and at the same time can be tracked with a GPS equipping the delivery vehicle. The GPS system updates generally arrives with latency. For example, the following sequence of events can happen:

A transit station may log time of arrival of a package;
the GPS system on the delivery vehicle may send update indicating that the package is still in transit.

If the timing update is received from the delivery vehicle starting from the previous transit point, then the package arrival timing and state may be overridden by the update coming from the GPS, thereby resulting in an inconsistent state. In the prior art, such inconsistency state is required to be corrected with manual fix from a user. With the self-adaptive data aggregator system 10 according to the embodiments of the invention, the update coming from the GPS may be rejected by a user and the scoring function may return a negative score for the data update action.

Whereas, if the timing update is received from the delivery vehicle which started from the current transit point, then the update is correct and the user may either accept or send no response, the scoring function returning a positive score.

In both case, which data update action is better can be learnt by the agent 11.

The data aggregation system 10 thus implements a self-learning process to improve the data aggregation quality and adjust the behaviour by continuously learning from (analysing) corrective actions, using the action scorings determined by the action scoring unit 104.

In some embodiments, the feedback data 400 inputted to the data aggregation system 10 by a user can be represented in a specific format, such as for example {updateId: id, userAction: 0/1}, where a zero ("0") value indicates an acceptation and a one ("1") value indicates a rejection. In case of no response, no data may be sent to the data aggregation system 10. The format of the feedback data may be enriched to include additional information like information indicating the reasons why the user rejected or accepted, or a corrective action the user took in response of the action by the agent 11.

Accordingly, real-time combination of multiple trusted data source devices 20 providing different dimensions can be used to optimize the quality of data managed by the system and the performances of the system.

This enables to generate a single data system 10 from several heterogeneous systems without requiring any human interaction. Such data aggregation system 10 can self-adjust and dynamically evolve as the data sources and/or the data quality change over the time without requiring any manual interaction.

The action scoring unit 104 may implement one or more reinforcement learning algorithms that enable aggregating multiple data sources, continuously self-evaluating data aggregation quality, performing self-learning to improve constantly, automatically adapting to the changes in the data source quality and context.

Conventional prior art solutions require hard code development to explicitly specify the way data are to be reconciled from the multiple data source devices 20 (by implementing manually the conditions, such as for instance hard-coding the rule "If (field F is not present in DATA SOURCE 1 then take field F in DATA SOURCE 2"). In contrast, the aggregation system according to the embodiments of the invention can continuously learn online from different explored combinations, generate a reward value if the output quality is within a range defined by an accuracy threshold, or explore more combinations than in the prior art.

In an exemplary application of the invention to the airline transport industry, the data source devices 20 may be one or more devices connected to target system 10, the target system 10 representing an Airline Traffic Control system which is connected to a plurality of data source devices 20 to aggregate data there from.

An airline control system uses a number of tools dedicated to the control of "slots" which correspond to time windows in which aircrafts pass through a controlled air space.

Slots are issued by Authorities on schedule and assignment basis (e.g. first scheduled, first assigned basis). While slots are assigned in a chronological order, disruptions often occur due to several factors, which requires optimal and dynamic reallocation of the assigned slots for the different aircrafts in a given controlled air space.

Slot operators are not only required to exchange slots among flights in the Aircraft Operator flight schedule but also to exchange information with other operators of the same airline managing additional tools related the control of other parameters related to air traffic. Exemplary tools include for example a flight schedule tool configured to keep track of the state of the schedule of an airline. The data managed by such additional tools can be impacted by a slot change. More generally, although such data management tools are managed separately by each associated operator for safety and security reasons, the data managed by these tools are dependent from each other in the sense that any change occurring on the data managed by one tool can impact one or more other tools. Further, the Airline Control system can receive messages from different data sources that can be inconsistent with each other.

Figure 2:
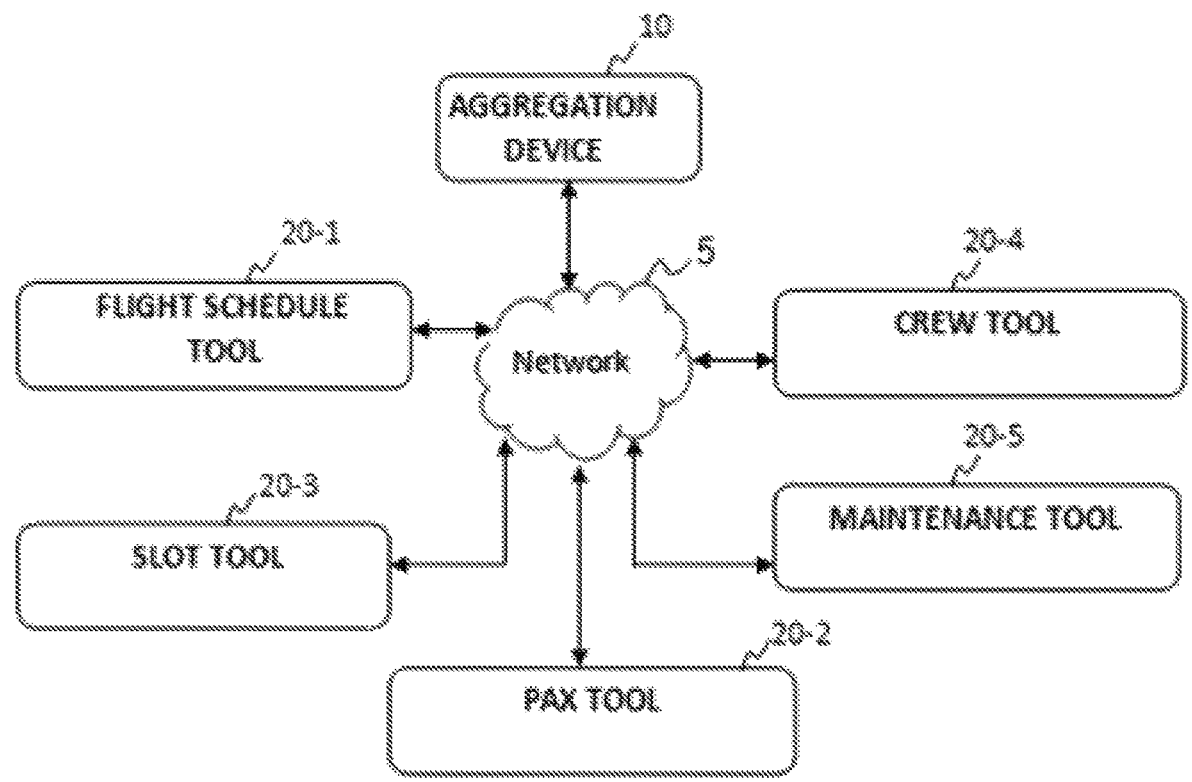
FIG. 2 represents an exemplary operational environment of the data aggregation system, according to an exemplary application of the invention to an Airline Control Tower System.

FIG. 2 represents an exemplary operational environment of a data aggregation system 10 according to an application of the invention to Airline Traffic Control.

The environment of FIG. 2 includes a plurality of data source devices 20 connected to the aggregation device 10 through the network 5, each data source device corresponding to a specific schedule management device in connection to Airline Traffic control. Each system 20 may further exchange data with other external systems such as an aviation resource management system, a passenger management system, etc.

In the exemplary environment of FIG. 2, the schedule management systems 20 may include:

An airline Schedule Management Tool 20-1 (also referred to hereinafter as "Airline Schedule Tool") which is configured to collect data from other external systems to keep track of the state of the schedule of an airline;

A PAX Management Tool 20-2 (also referred to hereinafter as "Pax Tool") which is configured to aggregate passenger data related to each flight of the Airline, such as the number of passengers traveling in a specific class for a given flight;

A Slot Management Tool 20-3 (also referred to hereinafter as "Slot Tool") which is configured to provide a slot assignment (such as for example landing or takeoff slot) for each flight; as used herein, a slot is defined at least by a beginning time, an end time, and an airport identifier;

A Crew Management Tool 20-4 (also referred to hereinafter as "Crew Tool") which is configured to aggregate data related to the crew per flight, such that the number of persons assigned per crew category (e.g. pilot) per flight;

A Maintenance Management Tool 20-5 (also referred to hereinafter as "Maintenance Tool") which is configured to provide maintenance data, which can include both schedule and unscheduled data for a given aircraft (such as for Example Auxiliary Power Unit (APU) checks).

It should be noted that the above list of scheduling management devices is not limitative and that the aggregation device 10 may transparently connect to new tools such as for example a Baggage Management Tool for keeping track of passenger baggage processing per flight.

The schedule tool 20-1 may manage a number of aircrafts. The schedule tool 20-1 may determine different schedules for each managed aircraft by assigning each aircraft to the schedules. When an aircraft starts performing schedules, airline disruptions caused for example by weather conditions, aircraft breakdown or other events, may occur, which impact the initial scheduling. Accordingly, the disrupted schedule may impact another schedule or data managed by other tools 20. For example, a disruption may cause a flight delay which can impact the availability of the aircraft for the next slots, the passenger connections, the crew schedule, etc.

The Crew Management Tool 20-4 may comprise a Crew Planning function configured to determine the minimum legal requirements for crew resources per flight for any given schedules plan over a period taking into account various parameters such as national and/or company regulations, crew constraints (e.g. vacations, day off, training) and/or preferences. Crew resource requirements may be represented by base, fleet or by individual crew rank/function category.

The crew management tool 20-4 may further comprise a Crew Assignment function configured to generate crew assignment per flight taking into account various regulations such as international, and/or national, and/or company regulations, and/or individual crew requests and preferences.

The crew management tool 20-4 may also comprise a Crew Tracking function configured to track the crew resources of an airline and dynamically identify available crew resources if additional resources are needed in some situations.

The crew management tool 20-4 may also comprise Crew Records in the form of a database for crew administration, medical, training records and flight/duty time accumulators.

In such application of the invention to Airline traffic control, a user of a system 20 (also referred to hereinafter as an "operator" or "operation controller" or "ops controller" or "stakeholder") designates the operator responsible for managing an aspect of airlines operation.

In an exemplary application of the invention to airline traffic control, the airline traffic control system (target system) 10 may receive messages from one or more data source 20 related to a given flight and comprising data related to flight diversion. For example, such message may relate to a flight having a current status: "Flight SYD-HKG grounded at SYD just before take-off".

For example, the airline control system 10 may receive:
A first data Message "MESSAGE 1" received from a first data source "SOURCE 1" comprising data indicating a diversion instruction for diverting the flight;
A data second Message "MESSAGE 2" received from a second data source 2 "SOURCE 2" comprising data indicating no diversion.

In existing airline traffic control systems, either the message 1 or the message 2 is accepted by an operator managing the airline traffic control system while the aggregation system 10 based on a static and human analysis. In contrast, the system 10 according to the invention is configured to determine an action to be executed by learning from past data related to same situations and by dynamically refining the consistency rules 15 using feedback data 400.

Embodiments of the invention thus address complexity of inconsistencies while merging data from different trusted sources to facilitate critical decision making process in near real-time.

The aggregation data system 10 according to the embodiments of the invention obviates the need for airline system administrators to perform manual corrective actions to rectify data (such corrective actions being performed in the prior art not in real-time, prior to raise an issue).

The aggregation data system 10 according to the embodiments of the invention further improves speed and real time processing of data volume, and complexity related to the heterogeneity of feeding systems. The software maintenance cost is also decreased as the target system is self-evolving and self-changing rapidly, if a new data source or a different data field is added.

The data from the different data source devices 20 can be accordingly dynamically aggregated into the target system 10 without a need to interrupt the target system operation.

Figure 3:
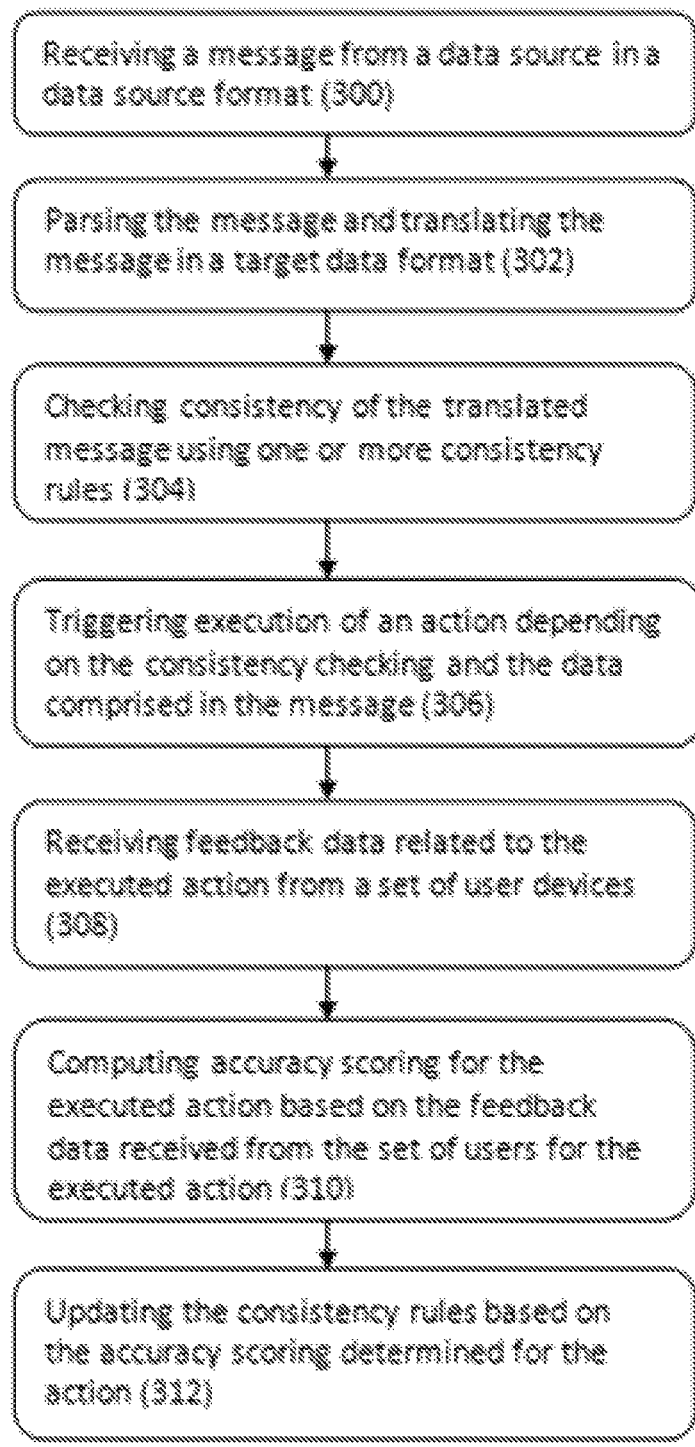
FIG. 3 is a flowchart illustrating a method of aggregating data from multiple data sources, in accordance with an embodiment of the invention.

FIG. 3 is a flowchart depicting the method of aggregating data received from a data source device 20 implemented into the target system.

In step 300, a message comprising data is received from a given data source device in a data source format.

In step 302, the message is parsed and data from the message are translated into a target data format of the target system 10 using translation rules.

In step 304, the consistency of the received data message in checked using consistency rules 15 based on the translated data.

In step 306, a data aggregation action is executed in response to the step of checking consistency of the message. Step 306 may further comprise storing at least a part of the translated data in the target system 10.

A notification may be then sent to a set of users to prompt them input feedback data related to the executed action, for example by selecting a feedback value among a set of possible feedback values (for example the list of feedback values can comprise "accept", "reject" and a "no response" values).

In response to the receipt of feedback data 400 from one or more users (block 308), an accuracy scoring is determined in step 310 for the executed action using a value function, the value function taking as inputs parameters related to the feedback values received from the set of users.

The value function may for example determine a reward value based on the feedback data received from the set of users.

In step 312, the one or more consistency rules 15 may be updated (for example refined) based on the accuracy scoring determined for the executed action.

In some embodiments, the method may comprise connecting a new data source to the data aggregation system 10 by implementing the following steps:
  Adding initial parsing rules in the Parsing Rules (12);
  Adding initial translation rules in the Translation Rules
  Adding initial consistency rules in the Consistency Rule (15);

When initial rules are defined, then each corresponding unit has a starting point which will be improved automatically as corrective actions and feedback data 400 are received from a user.

It should be noted that the invention is not limited to an application of the invention to the airline transport industry, and may generally apply to any architecture involving reception of data messages from multiple data source devices into a target system executing one or more data aggregation actions by merging the data comprised in such messages. For example, the invention may also be applied to a cloud computing based system sharing pools of data source devices over the Internet to deliver content or products to user devices.

Embodiments of the invention therefore provide a self-adaptive data aggregation method and system which obviates the need for hard coding or for use decoupled rules to integrate change related to the data source or improve the determination of the actions to be executed.

They further provide a self-learning process capable of determining which data source to trust the most for which information and under which circumstances.

Embodiments of the invention also enable solving data inconsistencies and conflicts in real-time with optimized reliability.

Embodiments of the invention obviate the need for a posteriori manual corrective actions.

The target system 100 can further dynamically integrate any change related to a data source in runtime without a need to block the system production.

One or more components of the aggregation system 10, such as the data aggregation device 10, the data source devices 20, and the user devices 4, may be implemented on one or more computing devices or systems, referred to collectively as a computer, such as computer.

Figure 4:
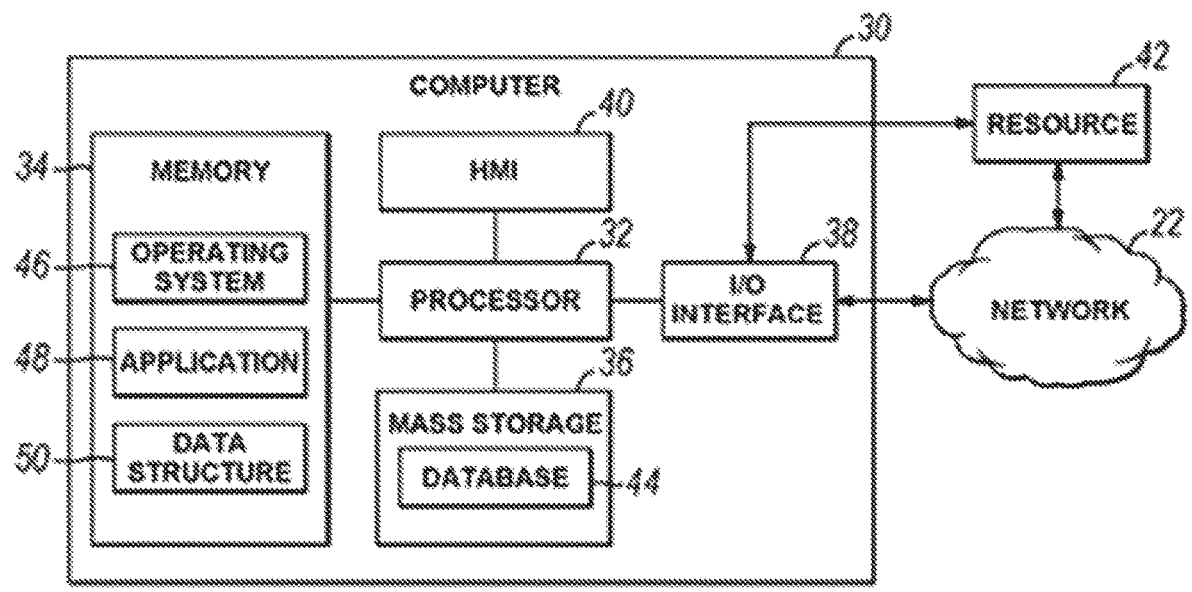
FIG. 4 is a diagrammatic view of an exemplary computing system for hosting a component of the environment of FIG. 1.

FIG. 4 is a block diagram schematically illustrating a computer 30 which may be used to implement components of the data aggregation system 10 and/or the data source devices and/or the user devices 4, according to some embodiments.

Computer 30 may comprise, for example, one or more devices selected from a desktop computer, a laptop computer, a workstation, a tablet computer, a smartphone, a handheld computer, an enterprise class server, or any other such computing device. A combination of different devices may be used in certain embodiments.

Computer 30 may include a processor 32, a memory 34, a mass storage memory device 36, an input/output (I/O) interface 38, and a Human Machine Interface (HMI) 39. The computer 30 may also be operatively coupled to one or more external resources 42 via the network 5 (which may be network 22 for example) and/or I/O interface 38. External resources may include, but are not limited to, servers, databases, mass storage devices, peripheral devices, cloud-based network services, or any other suitable computing resource that may used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, and/or application 48 to store or manipulate data.

The I/O interface 38 may provide a machine interface that operatively couples the processor 32 to other devices and systems, such as the network 5 and/or external resource 42. The application 48 may thereby work cooperatively with the network 6 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 5, such as a cloud computing service.

The HMI 39 (such as HMI 30 in the implementation of FIG. 1 of a user device 3) may be operatively coupled to the processor 32 of computer 30 in a known manner to allow a user of the computer 30 to interact directly with the computer 30. The HMI 39 may include video and/or alphanumeric displays, a touch screen, a speaker, and any other suitable audio and visual indicators capable of providing information to the user. The HMI 39 may also include input devices and controls such as an alphanumeric keyboard, a pointing device, keypads, pushbuttons, control knobs, microphones, etc., capable of accepting commands or input from the user and transmitting the entered input to the processor 32.

The database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, an object-oriented database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

While the invention has particular advantages in the field of airline control tower systems, it should be noted that the invention also applies to aggregation of data from multiple data sources, in a quasi real time environment.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. While the embodiments of FIG. 3 have been described according to a particular processing order, the skilled person will readily understand that the invention is not limited to such sequence of steps and that some steps can be implemented in a different order. More generally, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The invention claimed is:

1. A data aggregation system comprising:
   a first data source computing device, and a second data source computing device;
   a set of user computing devices; and
   a data aggregation computing device having (i) an interface communicatively coupled with the first and second data source computing devices and the set of user computing devices, (ii) a memory storing a database, and (iii) a processor configured to:
      receive, from the first data source computing device, a first message comprising first data corresponding to a target portion of the database;
      receive, from the second data source computing device, a second message comprising second data corresponding to the target portion of the database, the second data conflicting with the first data;
      in response to receiving the first and second messages, using (i) one or more consistency rules, and (ii) previously received data stored in the database to select
      a data aggregation action to be executed, from (i) storing the first message and discarding the second message, or (ii) storing the second message and discarding the first message;
      update the database according to the determined data aggregation action;
      in response to updating the database, send respective notifications to each of the set of user computing devices, the notifications including a list of selectable feedback values;
      determine an accuracy metric for the executed data aggregation action based on selected feedback values received from the set of user computing devices; and
      update the one or more consistency rules based on the accuracy metric determined for the executed data aggregation action.

2. The data aggregation system of claim 1, wherein the first data has a first source data format, the second data has a second source data format, and the database has a target data format; and
   wherein the processor is further configured to:
      parse the first and second messages in the respective first and second source data formats; and
      translate at least a part of the first and second data into the target data format.

3. The data aggregation system of claim 1, wherein the first message comprises an identifier identifying the first data source computing device.

4. The data aggregation system of claim 1, wherein the processor is further configured to:
   execute a value function using one or more parameters derived from the selected feedback values as inputs, and providing an output value; and
   determine the accuracy metric for the executed data aggregation action based on the output value.

5. The data aggregation system of claim 4, wherein the one or more parameters comprise a parameter representing a number of occurrences of a given feedback value received from the set of user devices.

6. The data aggregation system of claim 4, wherein the given feedback value is a value indicating a rejection of the data aggregation action.

7. The data aggregation system of claim 4, wherein the output value represents a reward value for the data aggregation action.

8. The data aggregation system of claim 1, wherein the consistency rules define at least one of (i) data cleaning conditions, (ii) data merging conditions, (iii) data consolidation conditions, and (iv) received feedback values for previous data aggregation actions.

9. A method of aggregating data, wherein the method comprises:
   storing, at a data aggregation computing device, a database;
   receiving, from a first data source computing device, a first message including first data corresponding to a target portion of the database;
   receiving, from a second data source computing device, a second message including second data corresponding to the target portion of the database, the second data conflicting with the first data;
   in response to receiving the first and second messages, using (i) one or more consistency rules, and (ii) previously received data stored in the database to select
   a data aggregation action to be executed, from (i) storing the first message and discarding the second message, or (ii) storing the second message and discarding the first message;
   updating the database according to the determined data aggregation action;
   in response to updating the database, sending respective notifications to each of a set of user computing devices, the notifications including a list of selectable feedback values;
   determining an accuracy metric for the executed action based on selected feedback values received from the set of user computing devices; and
   updating said consistency rules based on the accuracy metric determined for the executed data aggregation action.

10. The method of claim 9, further comprising:
    parsing the first message received from the first data source computing device in a first source data format, and parsing the second message received from the second data source computing device in a second source data format; and
    translating at least a part of the first data and the second data into a target data format corresponding to the database.

11. The method of claim 9, further comprising:
    executing a value function using one or more parameters derived from the selected feedback values as inputs, and providing an output value; and
    determining the accuracy metric for the executed data aggregation action based on the output value.

12. The method of claim 11, wherein the one or more parameters comprise a parameter representing a number of occurrences of a given feedback value received from the set of user devices.

13. A data aggregation computing device, comprising:
    an interface communicatively coupled with a first data source computing device, a second data source computing device, and a set of user computing devices;
    a memory storing a database; and
    a processor configured to:
       receive, from the first data source computing device, a first message comprising first data corresponding to a target portion of the database;
       receive, from the second data source computing device, a second message comprising second data corresponding to the target portion of the database, the second data conflicting with the first data;

in response to receiving the first aid second messages, using (i) one or more consistency rules, and (ii) previously received data stored in the database to select a data aggregation action to be executed, from (i) storing the first message and discarding the second message, or (ii) storing the second message and discarding the first message;

update the database according to the determined data aggregation action;

in response to updating the database, send respective notifications to each of the set of user computing devices, the notifications including a list of selectable feedback values;

determine an accuracy metric for the executed data aggregation action based on selected feedback values received from the set of user computing devices; and update the one or more consistency rules based on the accuracy metric determined for the executed data aggregation action.

* * * * *